United States Patent [19]
Hyde

[11] Patent Number: 4,877,147
[45] Date of Patent: Oct. 31, 1989

[54] TANK COMPRISING EMBEDDED FLANGED CONDUIT

[75] Inventor: James P. Hyde, Saline, Mich.

[73] Assignee: Ford Motor Company, Dearborn, Mich.

[21] Appl. No.: 226,901

[22] Filed: Aug. 1, 1988

[51] Int. Cl.⁴ .................... B65D 25/00; B65D 1/00
[52] U.S. Cl. ................... 220/85 VR; 220/85 VS; 264/274; 264/516
[58] Field of Search ............ 220/85 S, 85 VR, 85 VS, 220/367; 264/271.1, 274, 516

[56] References Cited

U.S. PATENT DOCUMENTS

| | | |
|---|---|---|
| 2,381,367 | 8/1945 | Quayle . |
| 2,750,232 | 6/1956 | Szantay et al. . |
| 2,928,138 | 3/1960 | Boggs . |
| 2,990,309 | 6/1961 | Wahl et al. . |
| 3,575,949 | 4/1971 | Humphrey . |
| 3,654,018 | 4/1972 | Bogue et al. . |
| 3,666,139 | 5/1972 | Urban . |
| 3,687,335 | 8/1972 | Hunter . |
| 3,705,931 | 12/1972 | Confer et al. .................... 264/274 X |
| 3,742,995 | 7/1973 | Confer et al. .................... 264/274 X |
| 3,896,199 | 7/1975 | Michaelis . |
| 3,919,374 | 11/1975 | Komendowski ................. 264/274 X |
| 3,929,425 | 12/1975 | Valdo . |
| 4,249,517 | 2/1981 | Schroeder et al. . |
| 4,517,882 | 5/1985 | Watanabe et al. . |
| 4,539,172 | 9/1985 | Winchell et al. ............... 264/516 X |
| 4,589,563 | 5/1986 | Born ................................ 264/516 X |
| 4,714,171 | 12/1987 | Sasaki et al. .................... 220/85 VR |

Primary Examiner—Gerald A. Michalsky
Attorney, Agent, or Firm—Peter D. McDermott; Roger L. May

[57] ABSTRACT

A molded plastic tank is disclosed to comprise a plastic tank wall and an externally flanged, closed-section conduit at least partially embedded in the wall. A method aspect of the invention for making certain embodiments of such molded plastic tank comprises the steps of:
(A) forming a molten plastic parison;
(B) locating an externally flanged conduit between the parison and a molding cavity surface;
(C) closing the mold around the parison;
(D) introducing fluid pressure into the parison to expand it outwardly against the cavity surface and at least partially envelop the flanges of the conduit; and
(E) removing the finished plastic tank.

15 Claims, 1 Drawing Sheet

TANK COMPRISING EMBEDDED FLANGED CONDUIT

BACKGROUND OF THE INVENTION

1. Field of the Invention

This invention is directed to a molded plastic tank, for example a motor vehicle fuel tank, and, more specifically, to a molded plastic tank comprising an externally flanged, closed-section conduit at least partially embedded in a wall of the tank.

2. Brief Description of the Prior Art

Holding containers and tanks such as water tanks, motor vehicle fuel tanks and the like, referred to simply as "tanks" herein, often have attached to them in some fashion one or more tubes, hoses or other such conduits. Fuel return lines, fuel vapor venting lines, and the like associated with the motor vehicle fuel tank, for example, typically are attached in some fashion to the tank at one or more points. It is known for this purpose to use a hot plate welding technique in which a plastic conduit and the surface of a plastic tank wall are partially melted while being pressed into contact with each other so as to be fused together. It is difficult to control such hot plate welding techniques, however, in view of the natural variation in material properties, dimensions, and ambient conditions. Accordingly, there is a need to provide a better process and design for attachment of conduit to a molded plastic tank. It is an object of the present invention to provide such product design and method of manufacture.

In U.S. Pat. No. 3,666,139 issued May 30, 1972 to Urban, a container is disclosed, described as being especially suitable as a fuel tank for motor vehicles, in which a top wall and an opposite side wall of the tank comprise a plurality of conduits for connecting the interior of the container with the atmosphere. That is, the tank is shown to have a plurality of vent lines. Each such vent line has a substantially horizontal section extending from an opening in the interior at one side wall toward the opposite side wall. Each such horizontally extending section bends sharply upward toward a remote vent opening. No detail is given regarding the manner in which the vent lines are attached to the fuel tank.

In U.S. Pat. No. 3,687,335 issued Aug. 29, 1972 to Hunter, a motor vehicle fuel tank is shown to comprise overfill limiting means. Specifically, a fuel tank is shown to have vent means, such as a plurality of vent lines which are positioned one each in the upper fuel tank corners. The vent lines pass through a wall in the tank and extend within its interior to the remote corners of the tank. No teaching is provided regarding particular means for attachment of the vent lines to the fuel tank.

In U.S. Pat. No. 3,575,949 issued Apr. 20, 1971 to Humphrey, a method is disclosed by which a tubular passageway can be incorporated into the wall of a blow-molded container. In the Humphrey method an elongated, open-section element is positioned within a blow molding tool and the container is blow molded against such element such that the plastic wall of the blow-molded container fuses with and closes the open-section channel-defining element to form therewith a tube. As best seen in FIGS. 5 and 6 of Humphrey, the open-section element does not itself define a channel able to contain a fluid flow but, rather, depends upon forming a perfectly complete perimeter seal with the tank wall blow molded against it. Because of this disadvantageous requirement and to prevent the conduit element of Humphrey pulling away from the container wall, the method of Humphrey requires that the material of the conduit element be fusible with the material from which the container is to be blow-molded. Thus, Humphrey suggests it to be desirable that the conduit element and the container wall be of the same material.

It is an object of the present invention to overcome the disadvantages of the prior art. In particular, it is an object of the invention to provide a process and a product wherein a conduit is provided in a tank wall, the conduit and tank wall optionally being of materials non-fusible with each other. It is further an object of the invention to provide such process and product wherein a perfectly continuous fusing or seal between the container wall and the conduit is not required either to ensure a fluid-tight conduit or to ensure against the conduit pulling out of or away from the tank wall.

SUMMARY OF THE INVENTION

According to the present invention a molded plastic fuel tank comprises a tank wall and an externally flanged, closed-section conduit at least partially embedded in the wall. Attachment of the conduit to the tank is ensured by the flanges extending externally from the surface thereof being embedded in the plastic of the tank wall. That is, the external flanges of the conduit provide attachment of the conduit to the tank in that the material of the tank wall at least partially covers outward facing flange surface.

The molded plastic tank of the present invention provides several significant advantages over prior known product designs. Specifically, the conduit is attached to the tank without the need for clips or like fastener means, although such auxiliary fastener means can be used if desired in conjunction with the embedded flange attachment of the invention. In addition, conduit attached to a molded plastic tank in the manner of the present invention can be sufficiently embedded to have little or no profile extending outwardly from the surrounding surface of the tank wall. This may be significant where the tank is to be positioned in such close proximity to another device as to leave insufficient clearance for a conduit merely attached so as to sit on the surface of the tank. The conduit can be embedded entirely within the plastic wall of the tank, whereby a smooth exterior surface is achieved. This may be desirable either for aesthetic reasons or for such functional reasons as protection of the conduit from puncture or rupture or to allow passage of another device over the surface of the tank uninterrupted by the presence of the conduit.

Another advantage of the present invention stems from the use of closed-section conduit. Because the conduit itself forms a fluid-tight passage, there is no need to form a perfectly continuous seal between the conduit and the tank wall to prevent leakage. This results in greater process design flexibility, lower production scrap, more durable and dependable products and lower costs. In particular, it allows the use of conduit fabricated of materials, e.g. flexible metal tubing, which would not be fusible with the tank wall.

According to a second aspect of the invention, a method is provided for making a molded plastic tank as described above. Specifically, the method of the invention comprises the steps of (A) forming a molten plastic parison;

(B) locating an externally flanged conduit between the molten plastic parison and the cavity surface of a molding die part, the conduit being substantially parallel to the parison and the cavity surface;

(C) closing the molding die part onto the molten plastic parison together with one or more additional molding die parts to enclose the molten plastic parison within them (i.e., within the molding cavity formed cooperatively by such molding die parts);

(D) introducing fluid pressure into the parison, expanding it outwardly against the cavity surface to give the tank its desired outer configuration and to at least partially embed the conduit into the molten material of the parison, i.e., at least partially into the tank wall; and (E) opening the molding die parts and removing the plastic tank.

Such method aspect of the present invention is suitable for producing tanks according to certain embodiments of the invention. It will be recognized in view of the present disclosure, however, that these and other embodiments of the product aspect of the invention can be produced according to methods other than those within the scope of the method aspect of the invention. The method of the present invention for making tanks is particularly advantageous in view of the integration of the blow molding step forming the tank with the step of forming the attachment of the conduit to the tank. Moreover, according to aspects of the method of the invention discussed further below, the additional advantage is possible of establishing fluid communication between the interior of the tank and the conduit during the blow molding step.

These and other aspects and advantages of the invention, both the product and method aspects thereof, will be further understood in view of the following detailed description of preferred embodiments and the referenced drawings which also form a part of this disclosure.

DETAILED DESCRIPTION OF PREFERRED EMBODIMENTS

In view of the present disclosure those skilled in the art will recognize numerous possible applications for molded plastic tanks according to the present invention. Thus, for example, motor vehicle fuel tanks according to the present invention may comprise one or more vent lines to provide fluid communication for fuel vapors from within the tank to the atmosphere. Such vent lines each may extend from a different point within the fuel tank to separate or a common control valve, thereby providing venting for the tank regardless of any changes in position or angle of the tank during use. Also, fuel delivery systems of the fuel injection type typically provide a fuel return line from the vehicle engine to the fuel tank. That portion of the fuel return line which runs along the tank prior to making actual fuel communication with the interior of the tank can be provided as an externally flanged conduit at least partially embedded in the tank according to the present invention.

Numerous other types of molded plastic holding tanks, that is, tanks forming a fluid holding chamber, can be provided according to various embodiments of the present invention and will be apparent to the skilled of the art in view of the present disclosure. Exemplary of such tanks other than motor vehicle fuel tanks are portable or stationary water tanks, beverage dispensing containers, etc. The externally flanged conduit which is at least partially embedded in the wall of such molded plastic tanks according to the invention can serve as vent lines, as described for motor vehicle fuel tanks above, dispensing conduits for the contents of the tank, filler conduits and the like.

Figure 1:
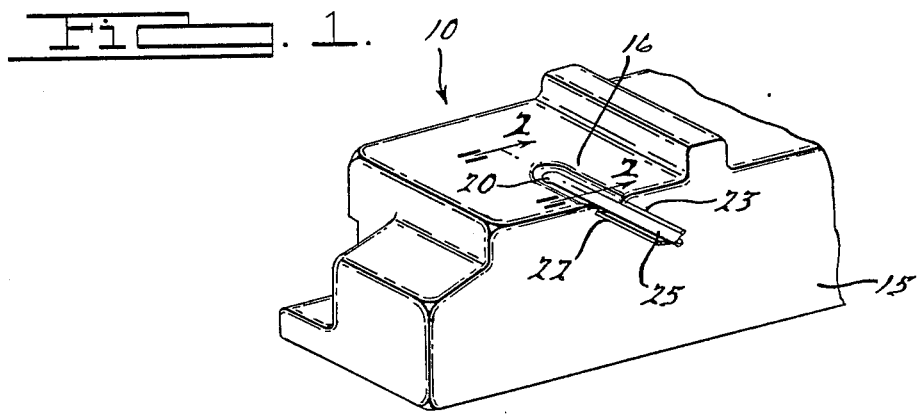
FIG. 1 is a perspective view, partially broken away, of a molded plastic tank according to a preferred embodiment of the invention showing an externally flanged conduit partially embedded in a plastic tank wall.
Figure 2:
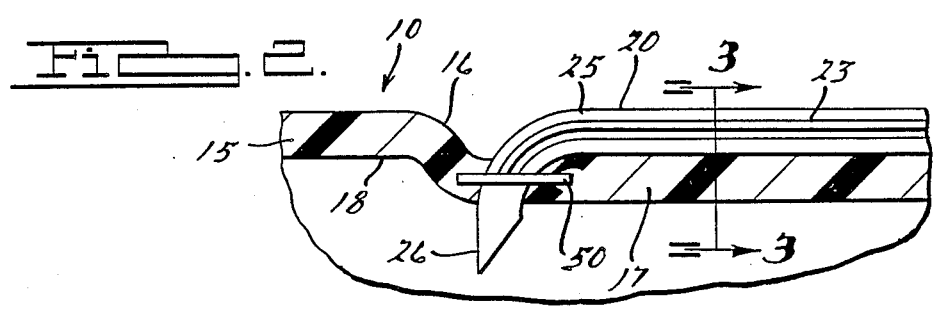
FIG. 2 is a section view taken through line 2—2 in FIG. 1, showing the externally flanged conduit partially embedded in the wall of the tank.
Figure 3:
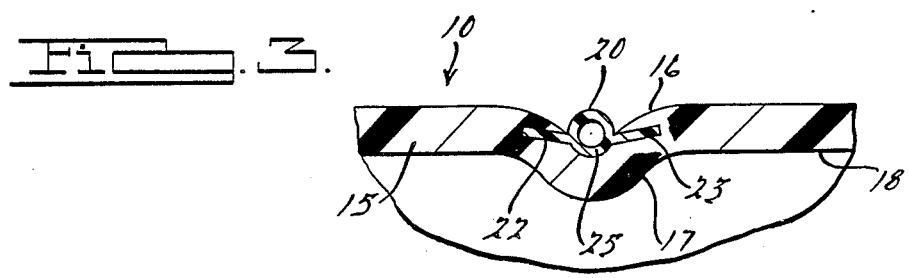
FIG. 3 is a section view taken through line 3—3 in FIG. 2, showing an end view of the externally flanged conduit in the tank wall.

Referring to the preferred embodiment of a motor vehicle fuel tank according to the invention shown in FIGS. 1–3, a blow molded plastic tank 10 is seen to comprise plastic walls including wall 15. An externally flanged conduit 20 is seen to be partially embedded in wall 15 of the tank. The conduit 20 comprises a pair of flanges 22, 23, each extending laterally from the main body 25 of the conduit. In the embodiment shown the flanges extend outwardly in approximately opposite directions and continuously along an elongate portion of the conduit. It will, of course, be apparent to those skilled in the art in view of the present disclosure that numerous alternative flange configurations are possible. Thus, for example, a single flange or more than two flanges may be used along some portion or all of the conduit. The configuration shown in FIGS. 1–3, however, has the advantage of being readily extrudable from various plastic materials and also could be readily fabricated from any of various metals. Techniques for making an elongated flanged tubular article are known, such as those disclosed in U.S. Pat. No. 2,990,309 issued June 27, 1961 to Wahl et al. That patent teaches a method of using a mold and mandrel for manufacturing a flanged, laminated plastic slit tube. An externally flanged flexible plastic tube made by an extrusion method is shown in U.S. Pat. No. 2,750,232 issued June 12, 19856 to Szantay et al. Although the use taught for that flanged conduit, a lawn soaker hose, is substantially unrelated to the use of the flanged conduit in the present invention, embedding the same in a plastic wall of a tank, the patent provides useful teaching regarding extrusion of conduit having a flanged configuration.

Where the conduit will extend from the tank to a remote location, such as in the case of a fuel return line carrying fuel to the tank from a motor vehicle engine, the external flanges of the conduit may be continued along its entire length or continued only along that portion of the conduit embedded in the wall of the tank. This will be determined by the method of manufacturing the conduit, cost factors, ease of manufacture, and like considerations well known to those skilled in the art.

Figure 4:
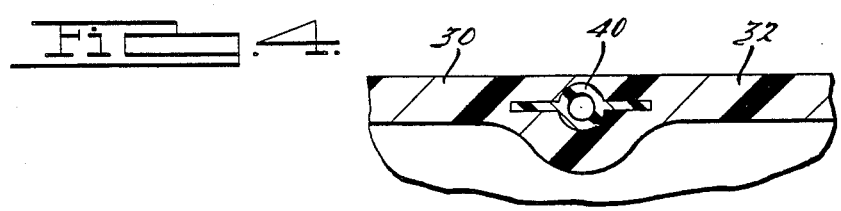
FIG. 4 is a section view, partially broken away, of an externally flanged conduit embedded in a plastic wall of a molded plastic tank according to an alternative embodiment of the invention.

As discussed above, embedding the flanged conduit entirely in the wall of the molded plastic tank, that is submerging it entirely below the surface of the tank wall to provide a smooth tank wall surface, provides the advantages of protecting the conduit from damage due to contact with items exterior to the tank, and greater ease of sliding contact of the tank wall surface with other items or devices. Such embodiment of the invention is depicted in FIG. 4, wherein the exterior surface 32 of tank wall 30 is seen to be substantially smooth and continuous over the entirely submerged flanged conduit 40.

It will be appreciated from the present disclosure that if the flanged conduit is not entirely embedded, that is entirely submerged within the plastic wall of the tank, it could be partially embedded in either an interior or exterior surface. Tanks fabricated according to the method aspect of the invention, further discussed below, will generally have the flanged conduit at an exterior surface of the tank. With reference to the embodiment of FIGS. 1-3, it can be seen that the externally flanged conduit 20 is partially embedded at exterior surface 16 of wall 15 of tank 10. In many cases, however, the underlying interior surface will be somewhat distorted by the presence of the conduit. Exemplary of this is the bulge 17 formed in the interior surface 18 of tank wall 15 in the embodiment of FIGS. 1-3.

Numerous suitable, commercially available extrudable plastics are well known to those skilled in the art and include, for example, nylon and polyethylene. The flanged conduit can be either flexible or ridged, depending on the intended function of the conduit and the tank and on manufacturing considerations discussed further below. Exemplary suitable metals for the flanged conduit include steel, aluminum and the like.

In the tank embodiment depicted in FIGS. 1-3 the externally flanged conduit 20 is in fluid communication with the tank, that is, with the interior volume of the tank. As seen in FIG. 2, free end 26 of the conduit 20 extends through the tank wall 15. In this way the conduit 20 can serve as a vent line for fuel vapors generated within the tank or as a fuel recirculation or return line. It will be apparent that numerous alternative embodiments of the invention, such as where the tank is a beverage holding container and the flanged conduit serves as a vent or beverage dispensing means, also will call for the conduit to be in communication with the interior of the tank. In those cases the tank preferably further comprises an anchor ring 50 as seen in FIG. 2. Anchor ring 50 preferably comprises a radially extending flange surrounding the conduit circumferentially so as to lie in a plane substantially normal to the axis of the conduit. The anchor ring is embedded in the plastic wall of the tank at the location of entry of the conduit into the interior of the tank. The anchor ring should be attached securely to the conduit to provide resistance against dislocation of the conduit, particularly pull-out of the free end of the conduit from the tank wall. The anchor ring can serve further to provide a better fluid seal at the opening in the tank wall formed by the free end of the conduit. In the case of a metal conduit the anchor ring can be substantially in the form of a washer or the like welded or brazed to the conduit. Similar configurations and attachment methods suitable for use in the case of plastic conduit will be apparent to the skilled of the art in view of the present disclosure.

Suitable materials for the molded plastic tank are well known to the skilled of the art and include numerous commercially available materials such as polyethylene, blends of polyethylene with nylon or like barrier resins for use as motor vehicle fuel tanks, polystyrene, and the like. As noted above, tanks according to the invention need not be formed by means of the blow molding method aspect of the invention. Rather, tanks within the scope of the invention also can be formed, for example, by injection molding and other molding techniques known to those skilled in the art.

According to the method aspect of the present invention, a molded plastic tank comprising an externally flanged conduit at least partially embedded in a wall of the tank is made by a method comprising the steps set forth above. The first step, forming a molten plastic parison, is well known to those skilled in the art of plastic blow molding. In brief, a molten plastic tube is extruded downwardly from an overhead nozzle. Molding die parts to form the molding cavity then are brought together around the parison and fluid pressure, typically air pressure, is introduced into the interior of the parison. The top and bottom of the parison tube must be sufficiently closed off to contain the fluid pressure, thereby forcing the parison outwardly into contact with the surface of the molding cavity imparting the desired configuration for the product to the molten plastic.

In the method of the present invention an externally flanged conduit as described above is located between the molten plastic parison and a molding cavity surface of a molding die part prior to closing the mold around the parison. It will be apparent that in order to embed the conduit in the surface of the molded tank, it generally will be necessary that the conduit be positioned substantially parallel to the parison surface and molding cavity surface prior to closing the mold. The conduit either can be affixed in a particular position by suitable fixturing means associated with the molding die part cavity surface or, where perhaps the precise location of the conduit in the tank wall is less important, the conduit can be left essentially free hanging between the parison and the molding die part cavity surface. In the case of a steel conduit, it can be held in position against the surface of the molding cavity by means of appropriately positioned magnets.

Once the externally flanged conduit is in position, the molding die part is closed onto the molten plastic parison, this typically occurring in conjunction with the closing of the other one or more molding die parts used to form the molding cavity for the plastic tank. After the mold is closed around the parison, as mentioned above, fluid pressure is introduced into the parison to expand it outwardly against the molding cavity surface. The molten plastic material of the parison, being expanded outwardly against the cavity surface contacts and at least partially envelopes the externally flanged conduit positioned between it and the surface of the molding cavity. It will be within the skill of those in the blow molding art to provide sufficient parison wall thickness in the region where it will envelope the conduit to ensure against rupture or undesirably thin wall section due to the presence of the conduit. Likewise, it will be within the skill of the art to adjust the molding process to obtain a finished tank product in which the conduit is embedded to the desired degree in the tank wall.

Following the molding step, the molding die parts are opened and the cured or at least partially cured plastic tank is removed and the process can be repeated.

As discussed above, in certain preferred embodiments of the invention the externally flanged conduit will be in fluid communication with the interior of the tank. According to certain preferred embodiments of the method aspect of the invention, such fluid communication can be achieved during the blow molding process. Specifically, a free end of the conduit, preferably having a bevel cut, such as that shown for free end 26 of flanged conduit 20 in FIG. 2, can be oriented in a direction substantially away from the cavity surface toward the molten plastic parison. When fluid pressure is introduced into the parison to expand it outwardly against the molding cavity surface, the free end of the flanged conduit will pierce through the molten plastic parison to be in fluid communication with the interior of the parison and hence of the finished tank. Such bevel cut in the free end of the conduit provides a pointed end to more easily pierce the parison wall. Also, the bevelled end is less likely to remove a plug of material from the parison wall which might clog the conduit. It will be appreciated by those skilled in the art in view of the present disclosure that orienting the free end of the conduit toward the parison generally will call for bending it at substantially a right angle to the main elongate section of the conduit. In those cases where the conduit is fashioned of a substantially rigid material, such bend at the free end can be formed in the conduit prior to positioning it between the parison and the molding cavity surface. In the case of a flexible conduit, the bend can be provided by suitable fixturing means for attaching the conduit to the molding die part with the free end held bent toward the parison.

It should be recognized that where multiple conduits are to be embedded in the walls of a molded plastic tank according to the invention, preferably they all are positioned between the parison and the molding cavity surface (of the same or a different molding die part) at this time.

The present invention has been described with reference to certain preferred embodiments and those skilled in the art, in view of the present disclosure, will appreciate that numerous alternative embodiments of the product and method aspects of the invention are within the scope of the following claims.

I claim:

1. A molded plastic tank comprising a tank wall and a closed-section conduit comprising an external flange, at least an elongate portion of said closed-section conduit being at least partially embedded in said wall, wherein
   (a) said flange extends longitudinally along at least said elongate portion of said closed-section conduit, and
   (b) substantially the entire exterior surface of said flange is submerged within said tank wall.

2. The molded plastic tank of claim 1, wherein said conduit comprises a pair of flanges, each extending laterally in approximately opposite directions.

3. The molded plastic tank of claim 1, wherein said flange extends continuously along at least said elongate portion of said conduit.

4. The molded plastic tank of claim 1, wherein at least said elongate portion of said closed-section conduit is entirely submerged within said tank wall.

5. The molded plastic tank of claim 1, wherein said conduit is made of flexible plastic material.

6. The molded plastic tank of claim 1, wherein said conduit is metal.

7. The molded plastic tank of claim 1, wherein said conduit is in fluid communication with the interior of said tank.

8. The molded plastic tank of claim 7, further comprising an anchor ring attached to said conduit and surrounding it circumferentially, said anchor ring being embedded in said tank wall at the location of entry of said conduit into the interior of said tank.

9. The molded plastic tank of claim 7, wherein said conduit is a vent line.

10. A motor vehicle fuel tank of blow molded plastic comprising a plastic tank wall and a conduit having a pair of flanges extending laterally approximately opposite each other and continuously along at least an elongate portion of said conduit, a longitudinal portion of each said flange being substantially entirely embedded in said tank wall, said conduit being in fluid communication with the interior of said tank and further comprising an anchor ring surrounding it circumferentially and embedded in said tank wall at the entry of said conduit into the interior of said tank.

11. The motor vehicle fuel tank of claim 10 wherein said conduit is a vent line.

12. The motor vehicle fuel tank of claim 10 wherein said conduit is a fuel recirculation line.

13. A method of making a plastic tank comprising the steps of:
   (A) forming a molten plastic parison;
   (B) locating a closed-section conduit having an external flange between said molten plastic parison and a cavity surface of a molding die part, wherein said flange extends longitudinally along at least an elongate portion of said closed-section conduit;
   (C) closing said molding die part onto said molten plastic parison together with at least one additional molding die part to enclose said molten plastic parison within them;
   (D) introducing fluid pressure into said parison, expanding it outwardly against said cavity surface and at least partially enveloping said flange of said conduit; and
   (E) opening said molding die parts and removing said plastic tank.

14. The method of claim 13 wherein said conduit comprises a pair of external flanges, each extending laterally in substantially opposite directions and continuously along at least an elongate portion of said conduit, and wherein said step (D) envelops less than all of said conduit but substantially all of said flanges.

15. The method of claim 13 wherein step (B) further comprises orienting a free end of said conduit in a direction substantially away from said cavity surface toward said molten plastic parison, and step (D) further comprises said free end piercing through said molten plastic parison to be in fluid communication with the interior of said tank.

* * * * *